United States Patent [19]

Smitka

[11] 4,244,609
[45] * Jan. 13, 1981

[54] SHEET-METAL CORNER PIECE FOR JOINING PROFILES OF GAS DUCT FLANGE JOINT

[76] Inventor: Günter Smitka, Am Bülzgraben 33, 5860 Iseriohn-Lethmate, Fed. Rep. of Germany

[*] Notice: The portion of the term of this patent subsequent to Nov. 7, 1995, has been disclaimed.

[21] Appl. No.: 920,164

[22] Filed: Jun. 29, 1978

[30] Foreign Application Priority Data

Jul. 5, 1977 [DE] Fed. Rep. of Germany ....... 2730307

[51] Int. Cl.² ............................................. F16L 23/00
[52] U.S. Cl. .................................... 285/405; 285/424
[58] Field of Search ................. 285/424, 405, 406

[56] References Cited

U.S. PATENT DOCUMENTS

| 3,199,901 | 8/1965 | Jeppsson | 285/424 X |
| 3,923,326 | 12/1975 | Mez | 285/424 X |
| 4,123,094 | 10/1978 | Smitka | 285/405 |

FOREIGN PATENT DOCUMENTS

| 2313425 | 9/1974 | Fed. Rep. of Germany | 285/424 |
| 2501611 | 7/1976 | Fed. Rep. of Germany | 285/424 |
| 2630554 | 1/1977 | Fed. Rep. of Germany | 285/424 |
| 1470494 | 1/1967 | France | 285/424 |

Primary Examiner—Thomas F. Callaghan
Attorney, Agent, or Firm—Karl F. Ross

[57] ABSTRACT

A gas duct is provided with a flange joint formed of a plurality of sheet-metal profiles each fitted over a respective duct side edge and of a plurality of corner pieces each joining together the two ends of two respective profiles. Each of these corner pieces is made of sheet metal and has a pair of legs formed with reinforcing corrugations. The legs fit into the ends of the profiles at the corners of the ducts. At the corner between the legs of each such corner piece is a hole surrounded by an annular corrugation that ensures proper spacing between two such corner pieces in a bolted-together joint assembly.

1 Claim, 3 Drawing Figures

SHEET-METAL CORNER PIECE FOR JOINING PROFILES OF GAS DUCT FLANGE JOINT

FIELD OF THE INVENTION

The invention relates to a flange joint for connecting together substantially rectangular-section sheet-metal duct parts, in particular for high-pressure gas installations, comprising profiles securable as a frame to the ends of the duct part and having flanges extending parallel to and perpendicular to the respective duct side wall for receiving the ends of the duct parts and for receiving legs of corner pieces in insert openings of the flange.

BACKGROUND OF THE INVENTION

It is known from my German patent No. 23 13 425 to connect duct parts in high-pressure gas installations by use of frame-like assembled profiles. These profiles are generally of L-section so that that they have flanges extending perpendicular to and parallel to the respective duct side walls. The ends of the duct part can be fitted into the latter flanges and then secured thereto.

The profiles are joined together at their corners by fitting the legs of angle pieces into the flange extending perpendicular to the respective duct side wall, with at least two corner pieces in a corner being joined or prestressed together by means of screws or the like. In this manner the optional seal between the perpendicular flanges as well as the optional seal in the corner region between the corner pieces can be clamped in place.

The corner pieces themselves can be made in accordance with my U.S. Patent applications Ser. Nos. 739,053 of Nov. 5, 1976 (now abandoned) and 870,720 of Jan. 19, 1978 (now U.S. Pat. No. 4,123,094) as simple flat iron elements with smooth legs and a corner region inset with respect to the legs. Since considerable forces must be brought to bear in the corner region by means of the mounting screws in order to hold the seal tight in this particular critical region, the flat iron pieces must be made relatively thick for stability, so that no excessively large bending or twisting can occur. This means that the corner pieces are relatively heavy and therefore have relatively high material and transport costs. Since this is a nass-produced article, these costs are particularly important.

OBJECT OF THE INVENTION

It is an object of the present invention to form the corner pieces for the above-described flange joint at lower cost with the same stability.

SUMMARY OF THE INVENTION

These objects are attained according to the instant invention in that the corner pieces are formed of relatively thin sheet metal with corrugation-like projections. As a result of the limited thickness of these shaped sheet-metal parts it is possible to reduce the weight over a solid structure up to 50%. Since this is a mass-produced article as described above enormous cost savings are thereby realized. This is due not only to the considerably decreased need for material, but also to a corresponding decrease in the transport cost per item. In addition these corner pieces take up considerably less room when stacked together, which also leads to a decrease in the transport costs.

The necessary stability of these corner pieces is attained by the formation of corrugation-like projections. The arrangement of these projections can be made according to need. As a result of this freedom of design with respect to the height as well as to the length of the projections the possibility exists to "set" the elasticity of the corner-piece legs in accordance with the requirements, so that in particular the prestressing with which the corner-piece legs are effective on the profiles and with which the optional seals between the profiles are clamped can be set at an optimum value. It is apparent that with the corner piece according to the invention even the advantageous features can be realized which are possessed by the corner piece according to patent application No. P 2,556,167.5.

In accordance with the invention the corner pieces have longitudinal corrugations parallel to their edges. These longitudinal corrugations give the corner-piece legs a particularly large stability. This can even be increased in accordance with the invention by connecting the longitudinal corrugations together lattice-fashion with transverse corrugations.

If the corner pieces in accordance with this invention are provided with screw holes for the screw coupling of respective adjacent corner pieces for joining duct parts, further according to the invention, in the region of the screw hole the corner piece is formed with bearing surfaces for spacing the adjacent corner pieces apart. In this manner a predetermined spacing can be provided between the legs of the corner pieces, so that neither too small nor too great clamping forces can be created between these two. These bearing surfaces can according to another feature of this invention be simply formed in that the inner edges of the screw holes are drawn in with respect to the adjacent corner piece.

In order to reinforce just this region it is finally possible that the screw holes are surrounded by an annular corrugation.

BRIEF DESCRIPTION OF THE DRAWING

In the following the invention is described with reference to an embodiment shown in the drawing. There is shown in.

SPECIFIC DESCRIPTION

Figure 1:
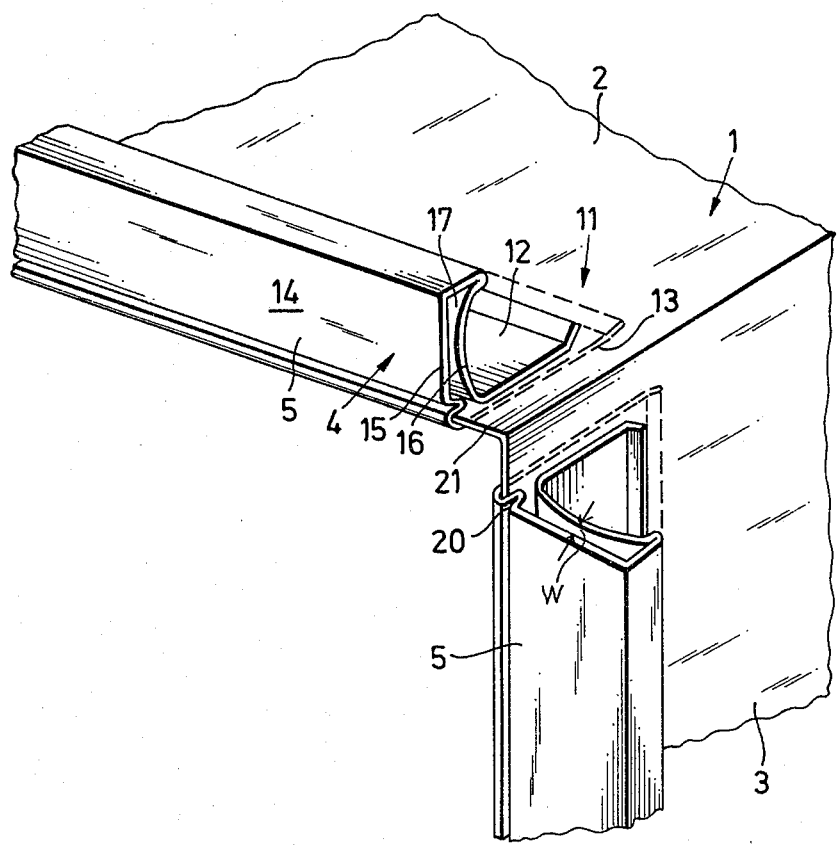
FIG. 1 a partial view of a gas duct with a flange joint without corners in perspective view.

FIG. 1 shows a part of an end region of a duct part 1 having an upper duct side wall 2 and a lateral duct side wall 3. A further lateral duct wall and a floor duct wall are not shown. The walls of the duct part 1 are made of sheet metal and can have any desired dimension.

The joining of two duct parts takes place by means of a flange joint 4 which is constituted substantially out of profiles 5 arranged respectively on the four walls of the duct part 1, of which only two are shown in FIG. 1, and of four identical profiles on the respective walls of the adjacent duct part. The profiles 5 are formed preferably of cold, Sendzimir-rolled galvanized steel and are connected together by means of corner pieces 6 shown in FIGS. 2 and 3, so that they form a prefabricated contruction unit. Each of these contruction units can be fitted over the end of the corresponding duct part 1. After the connection the profiles 5 can be connected with each other by means of not illustrated screws which are inserted in screw holes 7 of the corner pieces 6.

Each profile is formed substantially of a flange 11 extending parallel to the duct side wall and having an outer lip 12 and an inner lip 13, as well as a flange 14 extending perpendicular to the duct side wall and forming a recess 17 for receiving the cornerpiece legs 18 and 22 (FIG. 2) and having a front side 15 and a rear side 16 of concave shape in the illustrated embodiment. The sides 15 and 16 can each or both be curved or partly curved or can even be planar. Their spacing is such that a corner-piece leg 18 of a corner piece 6 can be inserted into the insertion opening 17 formed between them. The corner leg 18 lies with its lower edge 19 on the upper side of a labyrinth-shaped ridge 20 which is stamped out of the side 15 and which projects into the opening 17. The lower side of the ridge 20 serves together with the lip 13 as a gripper or abutment for the duct sidewall 2 whose edge 21 lies on the inner side of the side 15 below the ridge 20.

Figure 2:
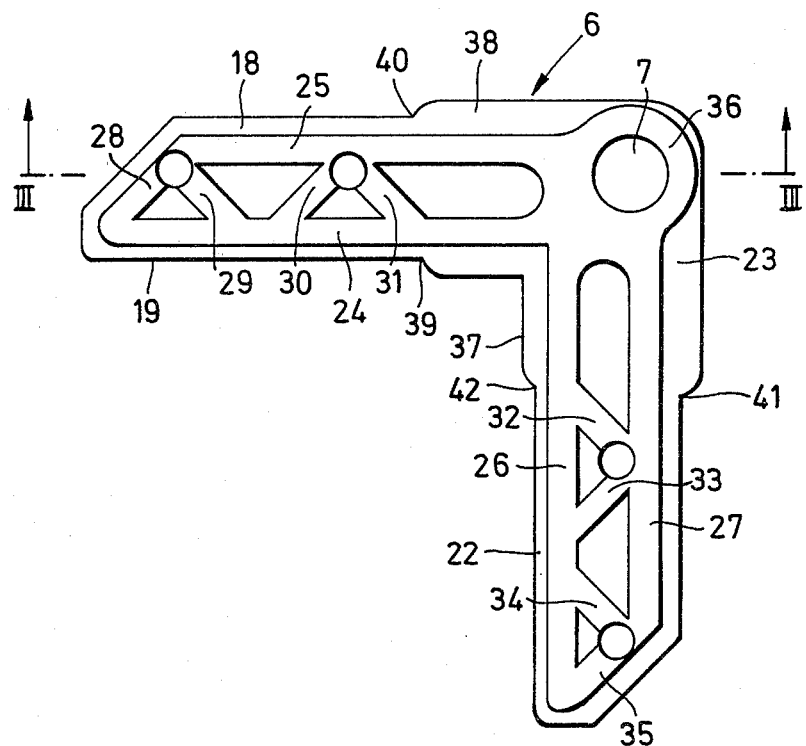
FIG. 2 a side view of a corner piece to complete the flange joint according to FIG. 1.
Figure 3:
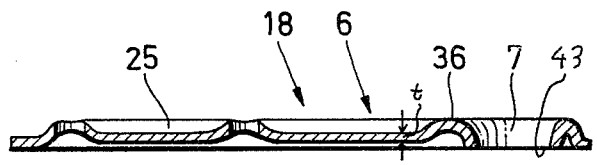
FIG. 3 a section taken along plane III—III through the corner piece according to FIG. 2.

The corner piece shown in FIGS. 2 and 3 has two identical and substantially perpendicular corner-piece legs 18 and 22 which are connected together via a corner 23 and which are bevelled at their ends for easy fitting into the recesses 17 (FIG. 1). The corner piece 7 is formed of sheet metal whose thickness t is smaller than the width w of the opening 17 (FIG. 1). In order that the corner piece 6 can attain the necessary stability and so that the concave side 16 (FIG. 1) can lie on it, corrugations are formed in the corner piece 6. Each corner-piece leg 18 and 22 has two longitudinal corrugations 24, 25 and 26, 27, respectively, which extend parallel to the longitudinal edges of the corner-piece legs 18 and 22. The respective parallel longitudinal corrugations 24, 25, 26 and 27 are connected together by respective transverse corrugations 28, 29, 30, 31 and 32, 33, 34, 35 which extend at angles of 45° thereto lattice-fashion, and which enclose trapezoidal or triangular impressed surfaces. The longitudinal corrugations 24, 25, 26, and 27 extend into the corner region 23 and into an annular corrugation 36 surrounding the screw holes 7. The nner edge 37 and the outer edge 38 of the corner region 23 is offset outwardly from the corner-piece legs 18 and 22. The corners 39, 40, 41, and 42 formed thereby constitute abutments for the profiles 5 (FIG. 1).

FIG. 3 shows a section along line III—III of FIG. 2 through the corner piece 6. This figure shows that the screw hole 7 is drawn inwardly. The inner edge 43 of this hole is drawn in so deeply that in assembled condition it lies on the inner edge of the screw hole of the corresponding corner piece. In this manner the associated corner pieces have a predetermined spacing so that the prestressing on these parts on which the corner-piece legs 18 and 22 lie has at each duct joint the desired value.

I claim:

1. A flange joint for the end of a polygonal-section duct having a plurality of straight duct sides meeting at duct corners, said joint comprising:
   a respective elongated L-section profile for each of said sides, each profile having one L-flange fittable over the respective side and another L-flange forming at each end a longitudinally open recess having a predetermined transverse dimension; and
   a respective sheet-metal corner piece for each of said corners and having a pair of legs each formed with at least two parallel and spaced-apart longitudinal corrugations and with at least one transverse corrugation bridging the respective longitudinal corrugations, each piece being of substantially constant thickness at and between the respective corrugations with said thickness being substantially smaller than said transverse dimension, each piece further being formed with a throughgoing screw hole and around said hole with an annular raised region.

* * * * *